(12) United States Patent
Florio

(10) Patent No.: US 12,465,628 B2
(45) Date of Patent: Nov. 11, 2025

(54) CANNABINOID CARRIER COMPOSITIONS HAVING ENHANCE PHARMACOKINETIC PROPERTIES AND METHODS OF USE THEREOF

(71) Applicant: Desert Harvest, Inc., Hillsborough, NC (US)

(72) Inventor: Heather Florio, Hillsborough, NC (US)

(73) Assignee: Desert Harvest, Inc., Ellsworth, ME (US)

( * ) Notice: Subject to any disclaimer, the term of this patent is extended or adjusted under 35 U.S.C. 154(b) by 30 days.

(21) Appl. No.: 18/181,014

(22) Filed: Mar. 9, 2023

(65) Prior Publication Data

US 2023/0210935 A1 Jul. 6, 2023

Related U.S. Application Data

(63) Continuation of application No. 16/772,055, filed as application No. PCT/US2020/035708 on Jun. 2, 2020, now abandoned.

(60) Provisional application No. 62/971,496, filed on Feb. 7, 2020.

(51) Int. Cl.
| | | |
|---|---|---|
| A61K 36/886 | (2006.01) | |
| A61K 9/00 | (2006.01) | |
| A61K 31/00 | (2006.01) | |
| A61K 36/185 | (2006.01) | |
| A61P 25/04 | (2006.01) | |

(52) U.S. Cl.
CPC .......... *A61K 36/886* (2013.01); *A61K 9/0053* (2013.01); *A61K 31/658* (2023.05); *A61K 36/185* (2013.01); *A61P 25/04* (2018.01); *A61K 2236/53* (2013.01)

(58) Field of Classification Search
None
See application file for complete search history.

(56) References Cited

U.S. PATENT DOCUMENTS

| | | |
|---|---|---|
| 4,957,907 A | 9/1990 | McAnalley |
| 10,398,776 B1 | 9/2019 | Chah et al. |
| 2013/0012575 A1 | 1/2013 | Letzel et al. |
| 2016/0287652 A1 | 10/2016 | Scott |
| 2018/0042890 A1 | 2/2018 | Sinai et al. |
| 2019/0216869 A1 | 7/2019 | Salm |
| 2019/0336457 A1 | 11/2019 | Chadwick et al. |
| 2020/0009078 A1 | 1/2020 | Kennedy |

FOREIGN PATENT DOCUMENTS

WO 2019195943 A1 10/2019

OTHER PUBLICATIONS

Li (Frontiers in Pharmacology (2022), vol. 13, article 854526, 13 pages).*
Park, et al., "Evaluation of Aloin and Aloe-Emodin as Anti-Inflammatory Agents in Aloe by Using Murine Macrophages", Bioscience, Biotechnology, and Biochemistry, vol. 73 Issue 4 (2009), pp. 828-832, abstract, p. 832 col. 1 para 4, 6 pages.
Cole, et al., "Skin permeation enhancement potential of Aloe Vera and a proposed mechanism of action based upon size exclusion and pull effect", International Journal of Pharmaceutics, vol. 333, Issues 1-2 (Mar. 21, 2007), pp. 10-16, entire document, 7 pages.
International Search Report and Written Opinion dated Sep. 8, 2020 in International Application No. PCT/2020/035708, 15 pages.
International Preliminary Report on Patentability in International Application No. PCT/US20/35708 issued on Aug. 18, 2022, 12 pages.
Canadian Intellectual Property Office, Office Action issued in corresponding Candian Patent Application No. 3,166,247 on Mar. 11, 2024, 6 pages.
Pascual, D. et al. "Chronic pain and cannabinoids. Great expectations or a Christmas carol", Biochemical Pharmacology, 157, pp. 33-42, Jul. 27, 2018 (Jul. 27, 2018).
Manzanares, J. et al. "Role of the cannabinoid system in pain control and therapeutic implications for the management of acute and chronic pain episodes", Current Neuropharmacology 4/3, pp. 239-257, Jul. 1, 2006 (Jul. 1, 2006).

* cited by examiner

*Primary Examiner* — Susan Hoffman
(74) *Attorney, Agent, or Firm* — J. Peter Paredes; Amin Wasserman Gurnani LLP

(57) ABSTRACT

Generally, the inventive technology relates to systems, methods, and compositions to formulate short-chain fatty acid phenolic compounds, such as cannabinoids, terpenes and other volatile compounds found in cannabinoid-producing plants such as *Cannabis*. In one embodiment, a natural or treated aloe vera extract may act as a cannabinoid-carrier and/or solubilizing agent forming one or more cannabinoid-infused aloe vera extract compositions, generally referred to herein as a composition or formulation of the invention. In one preferred aspect, the formulations and compositions of the invention may include safer and more palatable cannabinoid-delivery methods for both medicine and recreation. The formulations and compositions of the invention may further exhibit enhanced pharmacokinetic properties, such as enhanced bioavailability and increase adsorption in the gastrointestinal system.

13 Claims, 6 Drawing Sheets

| Comparision of Blood Serum Levels at 2 Hours After Ingestion | | | |
|---|---|---|---|
| | DH1 | SB1 | % Difference |
| CBD | 1.93 | 0.9 | 55% |
| 6a-OH-CBD | 0 | 0 | - |
| 6b-OH-CBD | 0 | 0 | - |
| 7-OH-CBD | 2.67 | 0.6 | 78% |
| 7-CBD-COOH | 9.53 | 6.6 | 30% |
| CBD-Gluc | 9.85 | 9.9 | -1% |
| THC | 0 | 0 | - |
| 11-OH-THC | 0 | 0 | - |
| THC-COOH | 0 | 1.6 | - |
| THC-COOH-Gluc | 0.31 | 0.7 | -110% |
| THC-Gluc | 0 | 0 | 0 |
| TOTAL CBD | 24 | 18 | 25% |
| TOTAL THC | 0.31 | 0.7 | -110% |

| | CBD | 7-OH-CBD | 7-CBD-COOH | CBD-Gluc | Total CBD |
|---|---|---|---|---|---|
| 1 | DH1 | DH1 | SB1 | DH1 | DH1 |
| 2 | DH1 | DH1 | DH1 | SB1 | DH1 |
| 3 | DH1 | SB1 | DH1 | DH1 | SB1 |
| 4 | SB1 | DH1 | DH1 | SB1 | SB1 |
| 5 | - | - | SB1 | DH1 | DH1 |
| 6 | - | - | DH1 | SB1 | SB1 |
| 7 | - | - | - | DH1 | - |

|  | No relief | Some relief | Significant relief |
|---|---|---|---|
| Subject 1 (RA, IC and Fibromyalgia) | 0 (0%) | 12 (41.4%) | 17 (58.6%) |
| Subject 2 (Trauma injury to spine and nerves) | 0 (0%) | 0 (0%) | 46 (100%) |
| Subject 3 (Knee osteoarthritis) | 4 (11.1%) | 28 (77.8%) | 4 (11.1%) |
| Total | 4 (3.6%) | 40 (36.0%) | 67 (60.4%) |

One Sample Proportion Calculator

Use this calculator to generate both a one-sample confidence interval and to test against a criteria or benchmark.

| # Passed | Total Tested | | Test Proportion |
|---|---|---|---|
| 28 | 29 | Is Greater Than ▾ | .50 |

Submit

Results
Exact Binomial p-value = 0

The probability the observed proportion 0.97 comes from a population greater than .50 is >99.99999%

The 95% Adjusted Wald Confidence interval is (81.36%, 100%)

FIGURE 7A

One Sample Proportion Calculator

Use this calculator to generate both a one-sample confidence interval and to test against a criteria or benchmark.

| # Passed | Total Tested | | Test Proportion |
|---|---|---|---|
| 46 | 46 | Is Greater Than ▾ | .50 |

Submit

Results
Exact Binomial p-value = 0

The probability the observed proportion 1 comes from a population greater than .50 is >99.99999%

The 95% Adjusted Wald Confidence interval is (93.34%, 100%)

CANNABINOID CARRIER COMPOSITIONS HAVING ENHANCE PHARMACOKINETIC PROPERTIES AND METHODS OF USE THEREOF

CROSS REFERENCE TO RELATED APPLICATION

This application is a continuation of U.S. patent application Ser. No. 16/772,055 filed Jun. 11, 2020, which is a national stage application under 35 U.S.C. 371 of PCT Application No. PCT/US2020/035708 having an international filing date of Jun. 2, 2020, now abandoned, which designated the United States, which PCT application claimed the benefit of U.S. Application Ser. No. 62/971,496, filed Feb. 7, 2020, all of which are incorporated by reference in their entireties.

TECHNICAL FIELD

The inventive technology is directed to the field of orally administered cannabinoid compositions having enhanced pharmacokinetics and absorption profiles as well as analgesic properties. Specifically, the inventive technology includes novel formulations having one or more cannabinoids, or *Cannabis* extracts, and novel aloe vera compositions that exhibit enhanced bioavailability and analgesic properties.

BACKGROUND

*Aloe vera* belongs to the Asphodelaceae family of plants. It is a succulent, tender plant containing a high water content (~99-99.5%). Solid content range from 0.5-1% and consists of a variety of active components such as fat and water soluble minerals, vitamins, simple/complex polysaccharides, organic acids, enzymes, and phenolic compounds. The aloe leaf itself can be divided into two major parts, namely the outer green rind, including the vascular bundles, and the inner colorless parenchyma containing the aloe gel. The three structural components of the *Aloe vera* pulp are the cell walls, the degenerated organelles and the viscous liquid contained within the cells. These three components of the inner leaf pulp have been shown to be distinctive from each other both in terms of morphology and sugar composition. It has been hypothesized that this heterogeneous composition of the *Aloe vera* pulp may contribute to the diverse pharmacological and therapeutic activities which have been observed for aloe gel products.

Cannabinoids are a class of specialized compounds synthesized by *Cannabis*. They are formed by condensation of terpene and phenol precursors. They include these more abundant forms: $\Delta^9$-tetrahydrocannabinol (THC), cannabidiol (CBD), cannabichromene (CBC), and cannabigerol (CBG). Another cannabinoid, cannabinol (CBN), is formed from THC as a degradation product and can be detected in some plant strains. Typically, THC, CBD, CBC, and CBG occur together in different ratios in the various plant strains. These cannabinoids are generally lipophilic, nitrogen-free, mostly phenolic compounds and are derived biogenetically from a monoterpene and phenol, the acid cannabinoids from a monoterpene and phenol carboxylic acid and have a C21 base. Cannabinoids also find their corresponding carboxylic acids in plant products. In general, the carboxylic acids have the function of a biosynthetic precursor. For example, the tetrahydrocannabinols $\Delta^9$- and $\Delta^8$-THC arise in vivo from the THC carboxylic acids by decarboxylation and likewise, CBD from the associated cannabidiolic acid.

Cannabinoids are widely consumed in a variety of forms around the world. Cannabinoid-rich preparations of *Cannabis*, either in herb (i.e. marijuana) or resin form (i.e., hash oil), are used by an estimated 2.6-5.0% of the world population (UNODC, 2012). Cannabinoid containing pharmaceutical products, either containing natural *Cannabis* extracts (Sativex®) or the synthetic cannabinoids dronabinol or nabilone, are available for medical use in several countries. As noted above, $\Delta$-9-tetrahydrocannabinol (also known as THC) is one of the main biologically active components in the *Cannabis* plant which has been approved by the Food and Drug Administration (FDA) for the control of nausea and vomiting associated with chemotherapy and, more recently, for appetite stimulation of AIDS patients suffering from wasting syndrome. The compounds, however, show other biological activities which lend themselves to possible therapeutic applications, such as in the treatment of glaucoma, migraine headaches, spasticity, anxiety, and as an analgesic.

Indeed, it is well documented that agents, such as cannabinoids and endocannabinoids that activate cannabinoid receptors in the body modulate appetite, and alleviate nausea, vomiting, and pain (Martin B. R. and Wiley, J. L, *Mechanism of action of cannabinoids: how it may lead to treatment of cachexia, emesis and pain*, Journal of Supportive Oncology 2: 1-10, 2004), multiple sclerosis (Pertwee, R. G., *Cannabinoids and multiple sclerosis*, Pharmacol. Ther. 95, 165-174, 2002), and epilepsy (Wallace, M. J., Blair, R. E., Falenski, K. W W., Martin, B. R., and DeLorenzo, R. J. Journal Pharmacology and Experimental Therapeutics, 307: 129-137, 2003). In addition, CB2 receptor agonists have been shown to be effective in treating pain (Clayton N., Marshall F. H., Bountra C., O'Shaughnessy C. T., 2002. CB1 and CB2 cannabinoid receptors are implicated in inflammatory pain. 96, 253-260; Malan T. P., Ibrahim M. M., Vanderah T. W., Makriyannis A., Porreca F., 2002. Inhibition of pain responses by activation of CB(2) cannabinoid receptors. Chemistry and Physics of Lipids 121, 191-200; Malan T. P., Jr., Ibrahim M. M., Deng H., Liu Q., Mata H. P., Vanderah T., Porreca F., Makriyannis A., 2001. *CB2 cannabinoid receptor-mediated peripheral antinociception.* 93, 239-245; Quartilho A., Mata H. P., Ibrahim M. M., Vanderah T. W., Porreca F., Makriyannis A., Malan T. P., Jr., 2003. *Inhibition of inflammatory hyperalgesia by activation of peripheral CB2 cannabinoid receptors.* Anesthesiology 99, 955-960) and multiple sclerosis (Pertwee, R. G., *Cannabinoids, and multiple sclerosis*, Pharmacol. Ther. 95, 165-174, 2002) in animal models.

More recently, several countries have approved the use of *Cannabis* and cannabinoid infused products for both recreational and medical uses. As a result, one area where cannabinoids have seen renewed interest is in the fields of cannabinoid-infused consumer products. However, the formulation and efficacy of these products has been limited to date by the inability to formulate the generally insoluble cannabinoid compounds. Specifically, cannabinoids are hydrophobic small molecules and, as a result, are highly insoluble. Due to this insolubility, cannabinoids such as CBD may need to be efficiently solubilized to facilitate transport, storage, and adsorption through certain tissues and organs. As described in, U.S. Pat. No. 8,410,064 by Pandya et al., in the human body cannabinoids may be subject to cytochrome P450 oxidation and subsequent UDP-glucuronosyltransferase (UGT)-dependent glucuronidation after consumption. The resulting glucuronide of the oxidized cannabinoids is the main metabolite found in urine, and thus, this solubilization process plays a critical role in the metabolic clearance of cannabinoids.

However, the ability to effectively solubilize cannabinoids has limited their applicability. Specifically, the inability to efficiently solubilize cannabinoids limits the compounds overall bioavailability, especially when orally ingested. This low bioavailability requires higher per-unit dosing which in turn results in increased costs. To overcome these limitations, many manufacturers of cannabinoid-infused products have adopted the use of traditional pharmaceutical delivery methods of using nanoemulsions of cannabinoids. This nanoemulsion process essentially coats the cannabinoid in a hydrophilic compound, such as oil or other similar compositions. However, the use of nanoemulsions is limited both technically, and from a safety perspective.

First, a large number of surfactants/cosurfactants are required for nanoemulsion stabilization. Moreover, the stability of nanoemulsions is inherently unstable, and may be disturbed by slight fluctuations in temperature and pH and is further subject to the "oswald ripening effect" or ORE. ORE describes the process whereby molecules on the surface of particles are more energetically unstable than those within. Therefore, the unstable surface molecules often go into solution shrinking the particle over time and increasing the number of free molecules in solution. When the solution is supersaturated with the molecules of the shrinking particles, those free molecules will redeposit on the larger particles. Thus, small particles decrease in size until they disappear, and large particles grow even larger. This shrinking and growing of particles will result in a larger mean diameter of a particle size distribution (PSD). Over time, this causes emulsion instability and eventually phase separation.

Second, nanoemulsions may not be safe for human consumption. For example, nanoemulsions were first developed as a method to deliver small quantities of pharmaceutical compounds having poor solubility. However, the ability to "hide" a compound, such as a cannabinoid, in a nanoemulsion may allow the cannabinoid to be delivered to parts of the body where it was previously prevented from entering, as well as accumulating in tissues and organs where cannabinoids and nanoparticles would not typically be found. Additionally, such nanoemulsions, as well as other water-compatible strategies, do not address one of the major-shortcomings of cannabinoid-infused commercial consumables, namely the strong unpleasant smell and taste. Moreover, such water-compatible strategies deliver inconsistent and delayed cannabinoid uptake in the body which may result in consumers ingesting a higher dose of cannabinoid-infused product than is recommended, as well as delayed and inconsistent medical and/or psychotropic experiences.

As a result, there is a need for more effective strategies to both formulate cannabinoids, and other associated compounds, such as terpenes and the like, in a way that is both cost-effective, as well as safe to consumers. There is a specific need for effective strategies to formulate cannabinoids that have therapeutic properties, such as CBD and THC, that have increased bioavailability. In addition, there is a strong market demand for all-natural solutions that do not rely on nanoemulsion technologies and the like.

As will be discussed in more detail below, the current inventive technology overcomes the limitations of traditional cannabinoid emulsion systems while meeting the objectives of a truly effective and scalable cannabinoid delivery system. Specifically, the invention may utilize natural, and preferably natural, or minimally processed organic aloe vera extract as a natural cannabinoid carrier and/or solubilizing agent to effectively deliver highly bioavailable therapeutic doses of cannabinoids to subjects in need thereof.

SUMMARY OF THE INVENTION

One aspect of the inventive technology relates to systems, methods, and compositions including short-chain fatty acid phenolic compounds, such as cannabinoids, terpenes and other volatile compounds found in cannabinoid-producing plants such as *Cannabis*. In one embodiment, a natural, or minimally processed aloe vera extract may act as a cannabinoid-carrier and/or solubilizing agent forming one or more cannabinoid-infused aloe vera extract compositions, generally referred to herein as a composition or formulation of the invention. In one preferred aspect, the formulations and compositions of the invention may include safer and more palatable cannabinoid-infused compositions.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, wherein such compounds have enhanced pharmacokinetic properties.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced pharmacokinetic properties.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced bioavailability.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds have enhanced bioavailability during oral administration.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced an adsorption profile.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds have an adsorption profile during oral administration.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds exhibit enhanced analgesic properties.

Another aspect of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds exhibit enhanced analgesic properties after oral administration.

Another aspect of the inventive technology relates to methods and compositions for the oral delivery of one or more cannabinoid-infused aloe vera extract compositions, wherein the aloe vera synergistically enhances the pharmacokinetic properties, bioavailability, absorption profiles and analgesic properties of the cannabinoids. In one preferred embodiment, oral administration of the cannabinoid-infused aloe vera extract compositions of the invention may be by capsule or other methods generally described herein.

Another aspect of the inventive technology relates to methods and compositions for the oral delivery of one or more CBD-infused aloe vera extract compositions, wherein the aloe vera synergistically enhances the pharmacokinetic properties, bioavailability, absorption profiles and analgesic properties of the CBD. In one preferred embodiment, oral administration of the CBD-infused aloe vera extract compositions of the invention may be by capsule or other methods generally described herein.

Another aspect of the inventive technology relates to an enhanced delivery system having an aloe vera extract infused with a *Cannabis* extract wherein said *Cannabis* extract interacts with one or more active ingredients of said aloe vera extract, and wherein the interaction produces at least one of the following: 1) increased bioavailability of said *Cannabis* extract when administered to a subject in need thereof; 2) increased solubility of said *Cannabis* extract; 3) enhanced therapeutic action of said *Cannabis* extract when administered to a subject in need thereof; 4) an enhanced absorption profile of said *Cannabis* extract when administered to a subject in need thereof; and 5) enhanced synergistic action of said *Cannabis* extract and said one or more active ingredients in the aloe vera extract producing a novel activation pattern of one or more cannabinoid receptors when administered to a subject in need thereof.

Another aspect of the inventive technology relates to an enhanced delivery system having an aloe vera extract infused with a cannabinoid wherein said cannabinoid interacts with one or more active ingredients of said aloe vera extract, and wherein the interaction produces at least one of the following: 1) increased bioavailability of said cannabinoid when administered to a subject in need thereof; 2) increased solubility of said cannabinoid; 3) enhanced therapeutic action of said cannabinoid when administered to a subject in need thereof; 4) an enhanced absorption profile of said *Cannabis* extract when administered to a subject in need thereof; and 5) enhanced synergistic action of said cannabinoid and said one or more active ingredients in the aloe vera extract producing a novel activation pattern of one or more cannabinoid receptors when administered to a subject in need thereof.

Another aspect of the inventive technology relates to an enhanced delivery system having an aloe vera extract infused with CBD wherein said CBD interacts with one or more active ingredients of said aloe vera extract, and wherein the interaction produces at least one of the following: 1) increased bioavailability of said CBD when administered to a subject in need thereof 2) increased solubility of said CBD; 3) enhanced therapeutic action of said CBD when administered to a subject in need thereof 4) an enhanced absorption profile of said *Cannabis* extract when administered to a subject in need thereof; and 5) enhanced synergistic action of said CBD and said one or more active ingredients in the aloe vera extract producing a novel activation pattern of one or more cannabinoid receptors when administered to a subject in need thereof.

Another aspect of the inventive technology relates to a method for treating a disease condition, comprising administering to a subject in need of treatment thereof a therapeutically effective amount of a composition of the invention, wherein the disease condition may be more effectively treated by a cannabinoid, and preferably CBD having enhanced pharmacokinetics properties, such as enhanced bioavailability and absorption profiles. In one preferred embodiment, a disease condition may be selected from the group consisting of: chronic pain associated with interstitial cystitis, rheumatoid arthritis, fibromyalgia, nerve damage, and osteoarthritis.

Another aspect of the inventive technology relates to one or more consumer products having a quantity of one or more compositions of the invention. In one preferred embodiment, consumer products may be selected from the group consisting of: a nutraceutical; a supplement; a food additive; a tablet, a gel, a lotion, and a beverage.

Another aspect of the inventive technology relates to a capsule configured for oral administration having a quantity of one or more compositions of the invention.

Additional aspects of the invention may be evident from the specification and figures below.

BRIEF DESCRIPTION OF THE DRAWINGS

FIG. 7 shows data generated from sample proportion calculator from exemplary subjects in pain self-reporting study conducted by the inventors in one embodiment thereof.

DETAILED DESCRIPTION OF THE INVENTION

Figures 1, 2:
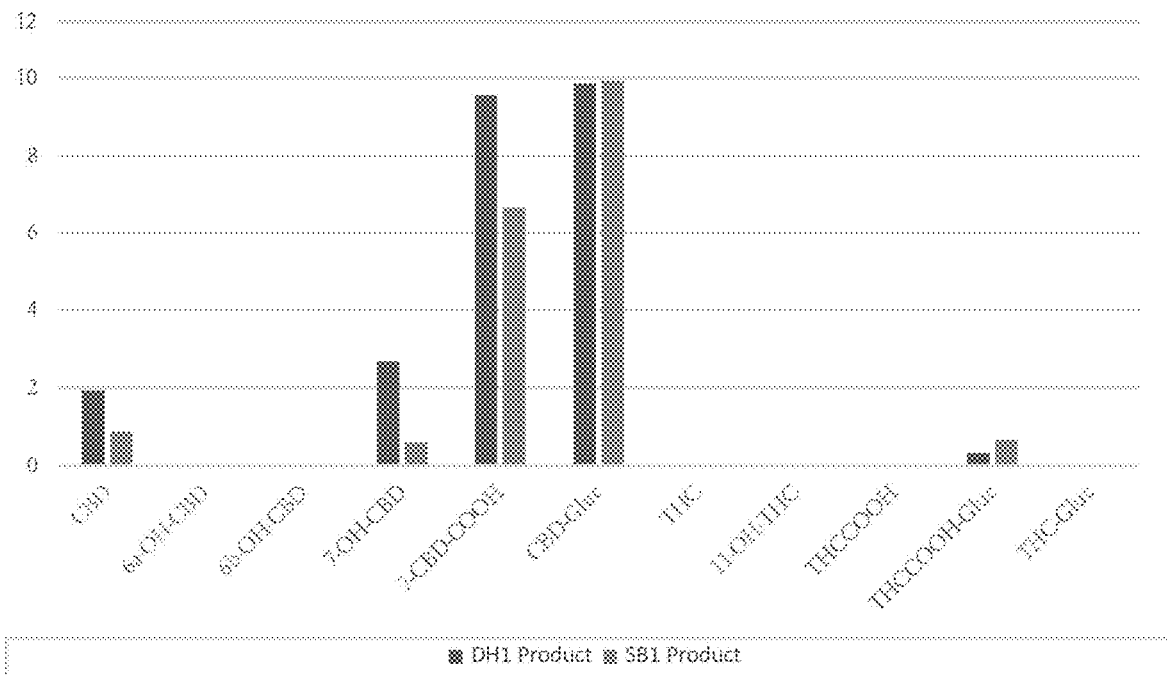
FIG. 1 shows a breakdown of blood serum levels (µg/L) of various cannabinoid metabolites at 2 hours after ingestion of formulation DH1 of the invention containing a CBD-infused aloe vera extract. Column 1 identifies the cannabinoid metabolites of a CBD-infused aloe vera extract DH1. Column 2 identifies the cannabinoid metabolites of a commercially obtained CBD capsule dose SB1. Column 2 shows the percent difference at 2 hours after ingestion in one embodiment thereof.
FIG. 2 shows a graphical description of blood serum levels of various cannabinoid metabolites at 2 hours after ingestion of formulation DH1 of the invention containing a CBD-infused aloe vera extract, compared to commercially obtained CBD capsule dose in one embodiment thereof.

The present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The inventive technology relates to systems, methods, and compositions to formulate short-chain fatty acid phenolic compounds, such as cannabinoids, terpenes and other volatile compounds found in cannabinoid-producing plants such as *Cannabis*. In one embodiment, a natural, or minimally processed aloe vera composition, and preferably a natural, or minimally processed aloe vera extract may act as a cannabinoid-carrier and/or solubilizing agent forming one or more cannabinoid-infused aloe vera extract compositions, generally referred to herein as a composition or formulation of the invention.

In certain embodiments, the invention may include the use of an aloe vera extract, or one or more of the active or inactive ingredients of an aloe vera extract as identified generally in Table 1, as carrier compounds to interact with and enhance the pharmacokinetic properties of cannabinoids, terpenes/terpenoids, and other short-chain fatty acid phenolic compounds. In a preferred embodiment, the present invention may include the usage of an aloe vera extract, or one or more of the active or inactive ingredients of an aloe vera extract as identified generally in Table 1, for increasing the water-solubility of target hydrophobic molecules including cannabinoids, terpenes, and volatiles. In a preferred embodiment, an aloe vera extract, or one or more of the active or inactive ingredients of an aloe vera extract as identified generally in Table 1, may be combined with target hydrophobic molecules such as cannabinoids, to aid in extraction, isolation, or storage, for example in consumer products.

As noted above, cannabinoid producing strains of *Cannabis*, as well as other plants may be utilized with the inventive technology. In certain preferred embodiments, *Cannabis* plant material may be harvested and undergo cannabinoid extraction through one or more of the methods generally known in the art. These extracted cannabinoids, terpenoids and other short chain fatty acid phenolic compounds, may be introduced to a quantity of aloe vera extract as described herein, and may preferably be configured to oral administration, for example through a capsule, or other like orally consumable product as generally described herein.

In certain embodiments, the compositions of the invention may enhanced effect may include one or more enhanced pharmacokinetic properties, including, but not limited to: 1) enhanced bioavailability, and preferably enhanced bioavailability in a human subject after oral delivery of a composition of the invention; and 2) enhanced absorption profile, and preferably an enhanced absorption profile in the gastrointestinal (GI) tract after oral delivery of a composition of the invention; 3) enhance analgesic properties, and preferably enhance analgesic properties in a human subject after oral delivery of a composition of the invention. As detailed below, in the composition(s) of the invention may constitute a therapeutically effect amount of one or more cannabinoids, which due to the enhanced pharmacokinetic properties may be less than a traditional cannabinoid administration system that lacks the invention's aloe vera extract composition.

Another embodiment of the inventive technology relates to an enhanced delivery system having an aloe vera extract infused with a *Cannabis* extract wherein said *Cannabis* extract interacts with one or more active ingredients of said aloe vera extract, and wherein the interaction produces at least one of the following: 1) increased bioavailability of said *Cannabis* extract when administered to a subject in need thereof; 2) increased solubility of said *Cannabis* extract; 3) enhanced therapeutic action of said *Cannabis* extract when administered to a subject in need thereof; 4) an enhanced absorption profile of said *Cannabis* extract when administered to a subject in need thereof and 5) enhanced synergistic action of said *Cannabis* extract and said one or more active ingredients in the aloe vera extract producing a novel activation pattern of one or more cannabinoid receptors when administered to a subject in need thereof.

Another embodiment of the inventive technology relates to an enhanced delivery system having an aloe vera extract infused with a cannabinoid wherein said cannabinoid interacts with one or more active ingredients of said aloe vera extract, and wherein the interaction produces at least one of the following: 1) increased bioavailability of said cannabinoid when administered to a subject in need thereof; 2) increased solubility of said cannabinoid; 3) enhanced therapeutic action of said cannabinoid when administered to a subject in need thereof; 4) an enhanced absorption profile of said *Cannabis* extract when administered to a subject in need thereof; and 5) enhanced synergistic action of said cannabinoid and said one or more active ingredients in the aloe vera extract producing a novel activation pattern of one or more cannabinoid receptors when administered to a subject in need thereof.

Another embodiment of the inventive technology relates to an enhanced delivery system having an aloe vera extract infused with CBD wherein said CBD interacts with one or more active ingredients of said aloe vera extract, and wherein the interaction produces at least one of the following: 1) increased bioavailability of said CBD when administered to a subject in need thereof; 2) increased solubility of said CBD; 3) enhanced therapeutic action of said CBD when administered to a subject in need thereof; 4) an enhanced absorption profile of said *Cannabis* extract when administered to a subject in need thereof; and 5) enhanced synergistic action of said CBD and said one or more active ingredients in the aloe vera extract producing a novel activation pattern of one or more cannabinoid receptors when administered to a subject in need thereof.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more active ingredients in an aloe vera extract.

Another embodiment of the invention may include a cannabinoid-infused aloe vera extract composition wherein at least one cannabinoid, and preferably CBD, is solubilized by one or more interactions or interacts with one or more cannabinoid carriers in an aloe vera extract, in this embodiment being one or more natural oils, or liposomes.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more proteins in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more sugars, such as a saccharide and/or polysaccharide, in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being an aloe vera extract wherein one or more anthraquinones/anthrones have been removed.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more chromones in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more enzymes in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more inorganic compounds in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more organic compounds in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more amino acids, in an aloe vera extract.

Another embodiment of the invention may include a cannabinoid-infused aloe vera extract composition wherein at least one cannabinoid, and preferably CBD, is solubilized by, or interacts with one or more cannabinoid carriers in an aloe vera extract, in this embodiment being one or more vitamins in an aloe vera extract.

Another embodiment of the present invention may include a cannabinoid-infused aloe vera extract composition wherein the cannabinoid may include an isolate, or a full spectrum *Cannabis* extract.

Another embodiment of the present invention may include a cannabinoid-infused aloe vera extract wherein the cannabinoid may include a CBD isolate, a full spectrum CBD extract, a broad-spectrum CBD extract or a combination thereof.

One embodiment of the inventive technology relates to systems, methods, and compositions to naturally formulate short-chain fatty acid phenolic compounds, such as cannabinoids, terpenes and other volatile compounds found in cannabinoid-producing plants such as *Cannabis*. In one embodiment, a natural, or minimally processed aloe vera extract may act as a cannabinoid-carrier and/or solubilizing agent forming one or more cannabinoid-infused aloe vera extract compositions, generally referred to herein as a composition or formulation of the invention. In one preferred embodiment, the formulations and compositions of the invention may include safer and more palatable Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, wherein such compounds have enhanced pharmacokinetic properties.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced pharmacokinetic properties.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced bioavailability.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds have enhanced bioavailability during oral administration.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds have enhanced an adsorption profile.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds have an adsorption profile during oral administration.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such compounds exhibit enhanced analgesic properties.

Another embodiment of the inventive technology relates to systems, methods, and compositions to formulate short-chain fatty acid phenolic compounds, such as cannabinoids, terpenes and other volatile compounds found in cannabinoid-producing plants such as *Cannabis*, wherein such formulations are configured for oral administration, and wherein the above compounds exhibit enhanced analgesic properties after oral administration.

Another embodiment of the inventive technology relates to methods and compositions for the oral delivery of one or more cannabinoid-infused aloe vera extract compositions, wherein the aloe vera synergistically enhances the pharmacokinetic properties, bioavailability, absorption profiles and analgesic properties of the cannabinoids. In one preferred embodiment, oral administration of the cannabinoid-infused aloe vera extract compositions of the invention may be by capsule or other methods generally described herein.

Another embodiment of the inventive technology relates to methods and compositions for the oral delivery of one or more CBD-infused aloe vera extract compositions, wherein the aloe vera synergistically enhances the pharmacokinetic properties, bioavailability, absorption profiles and analgesic properties of the CBD. In one preferred embodiment, oral administration of the CBD-infused aloe vera extract compositions of the invention may be by capsule or other methods generally described herein.

Another embodiment of the present invention may include pharmaceutical compositions containing at least one cannabinoid, or an extract from a *Cannabis* plant containing at least one cannabinoid, and an aloe vera extract, which may further include a processed aloe vera extract. Another embodiment of the present invention may include therapeutic uses of a pharmaceutical composition containing at least one cannabinoid, or an extract from a *Cannabis* plant containing at least one cannabinoid and an aloe vera extract, and preferably a processed aloe vera extract. Another embodiment of the invention may include a pharmaceutical kit containing a formulation and/or pharmaceutical composition of the invention, prescribing information for the composition, and a container.

Another embodiment of the present invention may include a capsule containing at least one cannabinoid, or an extract from a *Cannabis* plant containing at least one cannabinoid and an aloe vera extract, which may further include a processed aloe vera extract. Another embodiment of the present invention may include therapeutic uses of a capsule containing at least one cannabinoid, or an extract from a *Cannabis* plant containing at least one cannabinoid and an aloe vera extract, and preferably a processed aloe vera extract. Another embodiment of the invention may include a pharmaceutical kit containing a formulation and/or pharmaceutical composition of the invention in the form of a capsule, prescribing information for the composition, and a container.

Another embodiment of the present invention may include methods of treating one or more diseases and/or disorders by administering a therapeutically effective amount of a composition of the invention, and preferably a composition comprising at least one cannabinoid, or an extract from a *Cannabis* plant containing at least one cannabinoid and an aloe vera extract, and preferably a processed aloe vera extract having enhanced pharmacokinetic properties.

Another embodiment of the invention includes compositions of novel consumer products that incorporate one or more compositions of the invention, and preferably a composition comprising at least one cannabinoid, or an extract from a *Cannabis* plant containing at least one cannabinoid and an aloe vera extract, and preferably a processed aloe vera extract having enhanced pharmacokinetic properties. In one preferred embodiment, the novel consumer product may include a tablet or capsule (the terms being generally interchangeable) for oral administration having a therapeutically effective amount of a cannabinoid-infused aloe vera extract, and preferably a composition comprising at least one cannabinoid, or an extract from a *Cannabis* plant containing at least one cannabinoid and an aloe vera extract, and preferably a processed aloe vera extract having enhanced pharmacokinetic properties. As noted above, due to the enhanced bioavailability, and adsorption of the cannabinoid, and preferably CBD, the consumer product, in this case a capsule, requires less cannabinoids to produce a therapeutically effective amount.

In another preferred embodiment, the novel consumer product may include a tablet for oral administration having a therapeutically effective amount of a cannabinoid-infused aloe vera extract pharmaceutical composition. In one preferred embodiment, a tablet for oral administration having a therapeutically effective amount of a cannabinoid-infused aloe vera extract may include one or more of the exemplary embodiments identified in Table 2 below. Therapeutic effects and enhanced pharmacokinetic properties of the invention were demonstrated from the administration of a composition of the invention to subjects in need thereof, and are summarized in Examples 1-5, and FIGS. 1-7 below.

In another preferred embodiment, the novel consumer product may include one or more gels, ointments, cataplasms, poultices, pastes, creams, lotions, plasters, and jellies for transdermal administration having a therapeutically effective amount of a cannabinoid-infused aloe vera extract, and preferably a composition comprising at least one cannabinoid, or an extract from a *Cannabis* plant containing at least one cannabinoid and an aloe vera extract, and preferably a processed aloe vera extract having enhanced pharmacokinetic properties. In another preferred embodiment, the novel consumer product may include one or more gels, ointments, cataplasms, poultices, pastes, creams, lotions, plasters, and jellies for transdermal administration having a therapeutically effective amount of a cannabinoid-infused aloe vera extract pharmaceutical composition, and preferably a composition comprising at least one cannabinoid, or an extract from a *Cannabis* plant containing at least one cannabinoid and an aloe vera extract, and preferably a processed aloe vera extract having enhanced pharmacokinetic properties.

Another embodiment of the invention provides for methods of masking the typical unpleasant smell and taste of cannabinoid-infused commercial products. For example, in this embodiment a cannabinoid-infused aloe vera extract may interact with, bind to, or solubilize one or more cannabinoids and allow it to be solubilized in a gel, or gel-like solution. In this state, the cannabinoid-infused aloe vera extract allows for the masking of the cannabinoid's natural smell and taste. Moreover, in additional embodiments, a cannabinoid-infused aloe vera extract may interact with, bind to, or solubilize one or more terpenes or flavonoids, the compounds in *Cannabis* primarily responsible for its distinctive smell. In this manner, the invention may generate cannabinoid-infused commercial products, such as consumables that eliminate, mask, or ameliorate the undesired smell and taste of the cannabinoid and terpene compounds.

Another embodiment of the invention provides for methods of generating a cannabinoid-infused aloe vera extract having one or more cannabinoids, and optionally terpenes and other short-chain fatty-acid phenolic compounds, for example from a full spectrum *Cannabis* extract, that may have enhanced pharmacokinetic properties, such as a more rapid metabolic uptake, or absorption in the GI tract, or bioavailability upon ingestion. In this embodiment, a cannabinoid-infused aloe vera extract may interact with, bind to, solubilize, or otherwise protect one or more cannabinoids and/or terpenes such that upon ingestion it may have enhanced bioavailability, and be more readily taken up by the body, for example, through the association with one or more cannabinoid carriers present in the aloe vera extract. This embodiment may allow for not only a more rapid uptake of the target cannabinoid compound, but allow for consistent consumer experiences, as well as facilitate a safe and effective consumer-controlled dosing of cannabinoids and other compounds. Such cannabinoid-infused aloe vera extract having one or more carrier compounds may further protect the cannabinoid, or other compounds from being degraded by chemical processes in the body, such as would be present in the stomach or intestines. This embodiment may further allow for lower amounts of cannabinoid and terpenes to be used in infused consumables as a result of this improved bioavailability. For example, absent this enhanced bioavailability of the cannabinoids and terpenes, a large portion of the compounds may not be efficiently taken up by the body and may be eventually eliminated through natural chemical degradation or other strategies to metabolically clear the compounds from the body.

Another embodiment of the invention provides for methods of generating a cannabinoid-infused aloe vera extract having one or more cannabinoids, and optionally terpenes and other short-chain fatty-acid phenolic compounds, for example from a full spectrum *Cannabis* extracts, that may further be converted into a powder. In one preferred embodiment, cannabinoids, terpenes, and other short-chain fatty acid phenolic compounds may be infused with an aloe vera extract and may further undergo lyophilization or another similar process, to form a cannabinoid-infused aloe vera extract powder. This cannabinoid-infused aloe vera extract powder may have enhanced properties, such as enhanced cannabinoid affinity to provide greater retention and shelf-life to the cannabinoids in the powdered composition. Additionally, this cannabinoid infused powder may be reintroduced to a liquid, or other base compound, such as a pharmaceutically-acceptable carrier, such that the cannabinoids are re-dissolved in the liquid or gel. This powder may be used, for example, by consumers that wish to add a quantity of one or more cannabinoids to a beverage or other consumable product. It may also be used for pharmaceutical preparations and for proper cannabinoid dosing. This type of cannabinoid-infused aloe vera extract powder may be used as a food additive, or even coupled with flavoring agents to be used as a beverage additive.

The inventive technology may further include novel cannabinoid-infused aloe vera extracts that may exhibit enhanced therapeutic effects. In one preferred embodiment, the invention may include a pharmaceutical composition as active ingredient an effective amount or dose of one or more cannabinoid-infused aloe vera extracts. In some instances, the active ingredient may be provided together with pharmaceutically tolerable adjuvants and/or excipients in the pharmaceutical composition. Such pharmaceutical composition may optionally be in combination with one or more further active ingredients. In one embodiment, one of the aforementioned aloe vera extracts infused with one or more cannabinoids, terpenes or other short-chain fatty acid phenolic compounds may act as a prodrug. The term "prodrug" is taken to mean a cannabinoid-infused aloe vera extract according to the invention which may be configured to release the bound cannabinoid or other compound to form the therapeutically effective dose according to the invention.

An "effective amount" or "therapeutically effective amount" "effective amount" or "effective dose" or "dose" are interchangeably used herein and denote an amount of the one or more compositions of the invention having a prophylactically or therapeutically relevant effect on a disease or pathological conditions, i.e. which causes in a tissue, system, animal or human a biological or medical response which is sought or desired, for example, by a researcher or physician. For example, a "therapeutically effective amount" may include a cannabinoid-infused aloe vera extract administered to a human subject, either as a single dose or as part of a series of doses, which is effective to produce a desired therapeutic effect. Pharmaceutical formulations of a cannabinoid-infused aloe vera extract can be administered in the form of dosage units which comprise a predetermined amount of active ingredient per dosage unit. The concentration of the prophylactically or therapeutically active ingredient in the formulation may vary from about 0.1 to 100 wt %. Preferably, pharmaceutical formulations may be administered in doses of approximately 0.5 to 1000 mg, more preferably between 1 and 700 mg, and most preferably 5 and 100 mg per dose unit. Generally, such a dose range is appropriate for total daily incorporation. In other terms, the daily dose is preferably between approximately 0.02 and 100 mg/kg of body weight. The specific dose for each patient depends, however, on a wide variety of factors as already described in the present specification (e.g. depending on the condition treated, the method of administration and the age, weight, and condition of the patient). Preferred dosage unit formulations are those which comprise a daily dose or part-dose, as indicated above, or a corresponding fraction thereof of an active ingredient. Furthermore, pharmaceutical formulations of this type can be prepared using a process which is generally known in the pharmaceutical art.

The invention may include a topical formulation for the transdermal delivery of cannabinoids. In a preferred embodiment, a topical formulation for the transdermal delivery may include a cannabinoid-infused aloe vera extract, and optionally a pharmaceutically acceptable excipient. Preferably a pharmaceutically acceptable excipient may include one or more: gels, ointments, cataplasms, poultices, pastes, creams, lotions, plasters, and jellies or even polyethylene glycol. Additional embodiments may further include one or more of the following components: a quantity of capsaicin; a quantity of benzocaine; a quantity of lidocaine; a quantity of camphor; a quantity of benzoin resin; a quantity of methylsalicilate; a quantity of triethanolamine salicylate; a quantity of hydrocortisone; or a quantity of salicylic acid.

The invention may include a gel for transdermal administration of a cannabinoid which may include cannabinoid-infused aloe vera extract. In this embodiment, the mixture preferably contains from 15% to about 90% ethanol, about 10% to about 60% buffered aqueous solution or water, about 0.1 to about 25% propylene glycol, from about 0.1 to about 20% of a gelling agent, from about 0.1 to about 20% of a base, from about 0.1 to about 20% of an absorption enhancer and from about 1% to about 25% polyethylene glycol, and a cannabinoid-infused aloe vera extract as generally described herein.

In another embodiment, the invention may further include a transdermal composition having a pharmaceutically effective amount of a cannabinoid-infused aloe vera extract for delivery of the cannabinoid to the bloodstream of a user. This transdermal composition may include a pharmaceutically acceptable excipient and at least one cannabinoid-infused aloe vera extract, wherein the cannabinoid-infused aloe vera extract is capable of diffusing from the composition into the bloodstream of the user. In a preferred embodiment, a pharmaceutically acceptable excipient to create a transdermal dosage form selected from the group consisting of: gels, ointments, cataplasms, poultices, pastes, creams, lotions, plasters, and jellies. The transdermal composition may further include one or more surfactants. In one preferred embodiment, the surfactant may include a surfactant-lecithin organogel, which may further be present in an amount of between about 95% and about 98% w/w. In an alternative embodiment, a surfactant-lecithin organogel comprises lecithin and PPG-2 myristyl ether propionate and/or high molecular weight polyacrylic acid polymers. The transdermal composition may further include a quantity of isopropyl myristate.

The invention may further include transdermal composition having one or more permeation enhancers to facilitate transfer of the cannabinoid-infused aloe vera extract across a dermal layer. In a preferred embodiment, a permeation enhancer may include one or more of the following: propylene glycol monolaurate, diethylene glycol monoethyl ether, an oleoyl macrogolglyceride, a caprylocaproyl macrogolglyceride, and an oleyl alcohol.

Additional embodiment may include one or more of the compositions described in the skin treatment composition described in U.S. Pat. No. 9,370,545, wherein said Aloe Vera, or Aloe Vera powder may include a cannabinoid-infused aloe vera extract.

The compositions of the present invention may further be useful for a variety of therapeutic applications. For example, the compounds are useful for treating or alleviating symptoms of diseases and disorders involving CB1, CB2, GPR119, $5HT_{1A}$, µ and δ-OPR receptors, and TRP channels, including appetite loss, nausea and vomiting, pain, multiple sclerosis, and epilepsy. For example, they may be used to treat pain (i.e. as analgesics) in a variety of applications including but not limited to pain management. In additional embodiments, such cannabinoids may be used as an appetite suppressant.

In more specific embodiments, the invention may include one or more compositions for, and/or methods of, treating a medical condition in a subject in need thereof, and preferably a mammal subject, and more preferably a human or animal subject. In this embodiment, the novel method may include administering a therapeutically effective amount of a cannabinoid-infused aloe vera extract, wherein the medical condition is selected from the group consisting of: seborrheic dermatitis, psoriasis vulgaris, genital herpes, skin burns, diabetes (type 2), cancer prevention, ulcerative colitis, wound healing, obesity, post-traumatic stress syndrome, anorexia, nausea, emesis, pain, wasting syndrome, HIV-wasting, chemotherapy induced nausea and vomiting, alcohol use disorders, anti-tumor, amyotrophic lateral sclerosis, glioblastoma multiforme, glioma, increased intraocular pressure, glaucoma, Cannabis use disorders, Tourette's syndrome, dystonia, multiple sclerosis, inflammatory bowel disorders, arthritis, dermatitis, Rheumatoid arthritis, systemic lupus erythematosus, anti-inflammatory, anti-convulsant, anti-psychotic, anti-oxidant, neuroprotective, immunomodulatory effects, peripheral neuropathic pain, neuropathic pain associated with post-herpetic neuralgia, diabetic neuropathy, shingles, burns, actinic keratosis, oral cavity sores and ulcers, post-episiotomy pain, psoriasis, pruritis, contact dermatitis, eczema, bullous dermatitis herpetiformis, exfoliative dermatitis, mycosis fungoides, pemphigus, severe erythema multiforme (e.g., Stevens-Johnson syndrome), ankylosing spondylitis, psoriatic arthritis, Reiter's syndrome, gout, chondrocalcinosis, joint pain secondary to dysmenorrhea, fibromyalgia, musculoskeletal pain, neuropathic-postoperative complications, polymyositis, acute nonspecific tenosynovitis, bursitis, epicondylitis, post-traumatic osteoarthritis, synovitis, and juvenile rheumatoid arthritis. In a preferred embodiment, the pharmaceutical composition may be administered by a route selected from the group consisting of: transdermal, topical, oral, buccal, sublingual, intra-venous, intra-muscular, vaginal, rectal, ocular, nasal and follicular. The amount of cannabinoid-infused aloe vera may be a therapeutically effective amount, which may be determined by the patient's age, weight, medical condition, cannabinoid-delivered, route of delivery, and the like. In one embodiment, a therapeutically effective amount may be 50 mg or less of an isolated cannabinoid, or full spectrum Cannabis extract, or a mix of the two. In another embodiment, a therapeutically effective amount may be 50 mg or more of a cannabinoid-infused aloe vera extract, or 50 mg or more of a cannabinoid in a cannabinoid-infused aloe vera extract.

It should be noted that for any of the above composition, unless otherwise stated, an effective amount of the composition of the invention may include amounts between: 0.01 mg to 0.1 mg; 0.01 mg to 0.5 mg; 0.01 mg to 1 mg; 0.01 mg to 5 mg; 0.01 mg to 10 mg; 0.01 mg to 25 mg; 0.01 mg to 50 mg; 0.01 mg to 75 mg; 0.01 mg to 100 mg; 0.01 mg to 125 mg; 0.01 mg to 150 mg; 0.01 mg to 175 mg; 0.01 mg to 200 mg; 0.01 mg to 225 mg; 0.01 mg to 250 mg; 0.01 mg to 275 mg; 0.01 mg to 300 mg; 0.01 mg to 225 mg; 0.01 mg to 350 mg; 0.01 mg to 375 mg; 0.01 mg to 400 mg; 0.01 mg to 425 mg; 0.01 mg to 450 mg; 0.01 mg to 475 mg; 0.01 mg to 500 mg; 0.01 mg to 525 mg; 0.01 mg to 550 mg; 0.01 mg to 575 mg; 0.01 mg to 600 mg; 0.01 mg to 625 mg; 0.01 mg to 650 mg; 0.01 mg to 675 mg; 0.01 mg to 700 mg; 0.01 mg to 725 mg; 0.01 mg to 750 mg; 0.01 mg to 775 mg; 0.01 mg to 800 mg; 0.01 mg to 825 mg; 0.01 mg to 950 mg; 0.01 mg to 875 mg; 0.01 mg to 900 mg; 0.01 mg to 925 mg; 0.01 mg to 950 mg; 0.01 mg to 975 mg; 0.01 mg to 1000 mg; 0.01 mg to 2000 mg; 0.01 mg to 3000 mg; 0.01 mg to 4000 mg; 01 mg to 5000 mg; 0.01 mg to 0.1 mg/kg.; 0.01 mg to 0.5 mg/kg; 01 mg to 1 mg/kg; 0.01 mg to 5 mg/kg; 0.01 mg to 10 mg/kg; 0.01 mg to 25 mg/kg; 0.01 mg to 50 mg/kg; 0.01 mg to 75 mg/kg; and 0.01 mg to 100 mg/kg.

By "treating," the present inventors means that the compound is administered in order to alleviate symptoms of the disease or disorder being treated. Those of skill in the art will recognize that the symptoms of the disease or disorder that is treated may be completely eliminated or may simply be lessened. Further, the compounds may be administered in combination with other drugs or treatment modalities, such as with chemotherapy or other cancer-fighting drugs.

Implementation may generally involve identifying patients suffering from the indicated disorders and administering the compounds of the present invention in an acceptable form by an appropriate route. The exact dosage to be administered may vary depending on the age, gender, weight, and overall health status of the individual patient, as well as the precise etiology of the disease. However, in general, for administration in mammals (e.g. humans), dosages in the range of from about 0.01 to about 300 mg of compound per kg of body weight per 24 hr., and more preferably about 0.01 to about 100 mg of compound per kg of body weight per 24 hr., may be effective.

Administration may be preferably, oral or parenteral, including intravenously, intramuscularly, subcutaneously, intradermal injection, intraperitoneal injection, etc., or by other routes (e.g. transdermal, sublingual, oral, rectal, and buccal delivery, etc.). In a preferred embodiment of the invention, the compositions are provided orally in a pharmaceutical composition.

"Pharmaceutical compositions" are compositions that include an amount (for example, a unit dosage) of one or more of the disclosed compounds together with one or more non-toxic pharmaceutically acceptable additives, including carriers, diluents, and/or adjuvants, and optionally other biologically active ingredients. Such pharmaceutical compositions can be prepared by standard pharmaceutical formulation techniques such as those disclosed in Remington's *Pharmaceutical Sciences*, Mack Publishing Co., Easton, Pa. (19th Edition). In one preferred embodiment, a pharmaceutical composition may include an aloe vera extract, that may preferably include a processed aloe vera extract, and a *Cannabis* extract, and/or at least one isolated cannabinoids from a *Cannabis* extract, and/or a plurality of cannabinoids and other compounds, such as phenolic compounds such as terpenoids, derived from a *Cannabis* extract.

A "pharmaceutically-acceptable carrier" as used herein means a pharmaceutically-acceptable material, composition or vehicle, such as a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. In one preferred embodiment, the inactive, and or active components of an aloe vera extract of the invention may be a pharmaceutically-acceptable carrier.

The compounds may be administered in the pure form or in a pharmaceutically acceptable formulation including suitable elixirs, binders, and the like (generally referred to as a "secondary carrier") or as pharmaceutically acceptable salts (e.g. alkali metal salts such as sodium, potassium, calcium or lithium salts, ammonium, etc.) or other complexes. It should be understood that the pharmaceutically acceptable formulations include liquid and solid materials conventionally utilized to prepare both injectable dosage forms and solid dosage forms such as tablets and capsules and dosage forms. In addition, the compounds may be formulated with aqueous or oil based vehicles. Water may be used as the carrier for the preparation of compositions, which may also include conventional buffers and agents to render the composition isotonic. Other potential additives and other materials (preferably those which are generally regarded as safe [GRAS]) include: colorants; flavorings; surfactants (TWEEN, oleic acid, etc.); solvents, stabilizers, elixirs, and binders or encapsulants (lactose, liposomes, etc.). Solid diluents and excipients include lactose, starch, conventional disintergrating agents, coatings, and the like. Preservatives such as methyl paraben or benzalkium chloride may also be used. Depending on the specific formulation utilized, it may be expected that the active composition will consist of about 1% to about 99% of the composition and the secondary carrier will constitute about 1% to about 99% of the composition. The pharmaceutical compositions of the present invention may include any suitable pharmaceutically acceptable additives or adjuncts to the extent that they do not hinder or interfere with the therapeutic effect of the active compound.

The formulations suitable for oral administration may be in the form of capsules, cachets, pills, tablets, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia), each containing a predetermined amount of a compound of this disclosure as an active ingredient. The tablets, and other solid dosage forms of the pharmaceutical compositions of the present invention, such as dragees, capsules, pills, and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be formulated for rapid release, e.g., freeze-dried. They may be sterilized by, for example, filtration through a bacteria-retaining filter, or by incorporating sterilizing agents in the form of sterile solid compositions which can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions which can be used include polymeric substances and waxes. The active ingredient can also be in micro-encapsulated form, if appropriate, with one or more of the above-described excipients.

The administration of the compounds of the present invention may be intermittent, or at a gradual or continuous, constant, or controlled rate to a patient. In addition, the time of day and the number of times per day the pharmaceutical composition of the invention, and preferably a cannabinoid-infused aloe vera extract, is administered may vary and are best determined by a skilled practitioner such as a physician. Further, the effective dose can vary depending upon factors such as the mode of delivery, gender, age, and other conditions of the patient, as well as the extent or progression of the disease. The compounds may be provided alone, in a mixture containing two or more of the compounds of the invention, or in combination with other medications or treatment modalities.

Formulations or dosage forms for the topical or transdermal administration of an oligomer as provided herein include powders, sprays, ointments, pastes, creams, lotions, gels, solutions, patches, and inhalants. One or more compositions of the invention may be mixed under sterile conditions with a pharmaceutically-acceptable carrier, such as an aloe vera extract, and may further optionally include one or more additional preservatives, buffers, or propellants which may be required. The ointments, pastes, creams and gels may contain, in addition to an active composition of this invention, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an oligomer of the present invention, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a composition of this disclosure to the body. Such dosage forms can be made by dissolving or dispersing the one or more compositions of the invention, and preferably a cannabinoid-infused aloe vera extract, in the proper medium. Absorption enhancers can also be used to increase the flux of the agent across the skin. The rate of such flux can be controlled by either providing a rate controlling membrane or dispersing the agent in a polymer matrix or gel, among other methods known in the art.

Figure 8:
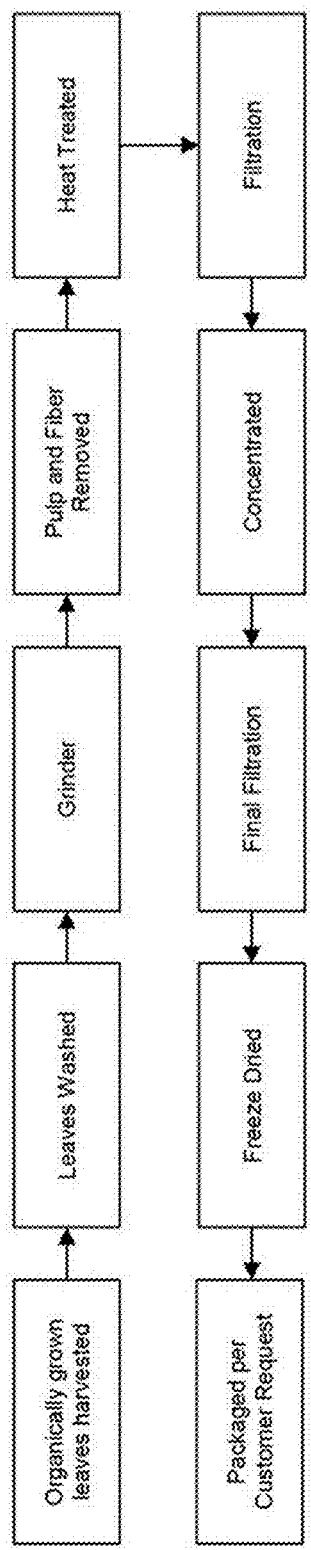
FIG. 8 shows a step-wise schematic diagram of an exemplary also vera processing system in one embodiment thereof.

As used herein, the term "aloe vera," or "aloe vera extract" means a compound or composition comprising an extract, exudate, gel, juice, sap or latex derived from a plant of the *Aloe* genus (e.g., "Aloe vera," with *Aloe barbadensis* Miller and *Aloe aborescens* being the most widely used species for commercial purposes), including simple leaf pressings or cuttings, preferably, Aloe vera is a clear colorless semi-solid Aloe Gel that has been stabilized. Aloe Vera may further include one or more inactive and active ingredients identified in Table 1 below. In one specific embodiment, term "aloe vera," or "aloe vera extract" may include a whole leaf extract and may further include and aloe vera extract wherein the anthraquinones and/or insoluble fibers have been removed, for example through, charcoal activation or other such known process. For example, in one embodiment aloe vera extract may be processed using the method outlined in FIG. 8. In this embodiment, as noted above, insoluble anthraquinones and/or insoluble fibers may be removed during the treatment process. For example, in this embodiment shown below, the inventors may employ a freeze dry process to remove the water, insoluble fiber, and anthraquinones, such that the aloe vera extract contains the gel and inner leaf without the anthraquinones As used herein, the term "cannabinoid carrier" means one or more components in an aloe vera extract that interacts with one or more components of a *Cannabis* extract, to increase its bioavailability, potency, or one or more synergistic interactions that increase the bioavailability, or therapeutic potency, of one or more components of the *Cannabis* extract.

As used herein, the term "pharmacokinetics" means a pharmacokinetic profile that may be achieved as measured, for example, by standard pharmacokinetic parameters such as time to maximal plasma concentration ($T_{max}$), the magnitude of maximal plasma concentration ($C_{max}$) or the time to elicit a minimally detectable blood or plasma concentration ($T_{lag}$).

As used herein, "improved or enhanced pharmacokinetics" means increased bioavailability, decreased lag time ($T_{lag}$), decreased $T_{max}$, more rapid absorption rates, more rapid onset and/or increased $C_{max}$ for a given amount of agent administered, compared to conventional administration methods.

As used herein, "bioavailability", means the total amount of a given dosage of the administered agent that reaches the blood compartment. This is generally measured as the area under the curve in a plot of concentration vs. time. As used herein, "lag time" means the delay between the administration of the agent and time to measurable or detectable blood or plasma levels. $T_{max}$ is a value representing the time to achieve maximal blood concentration of the agent, and $C_{max}$ is the maximum blood concentration reached with a given dose and administration method. The time for onset is a function of $T_{lag}$, $T_{max}$ and $C_{max}$, as all of these parameters influence the time necessary to achieve a blood (or target tissue) concentration necessary to realize a biological effect. $T_{max}$ and $C_{max}$ can be determined by visual inspection of graphical results and can often provide sufficient information to compare two methods of administration of an agent, composition, or formulation. However, numerical values can be determined more precisely by kinetic analysis using mathematical models and/or other means known to those of skill in the art.

As used herein, the term "enhanced absorption profile," means that absorption is improved or greater as measured by such pharmacokinetic parameters. The measurement of pharmacokinetic parameters and determination of minimally effective concentrations are routinely performed in the art.

A "cannabinoid-infused" extract means an aloe vera extract that includes one or more components from a *Cannabis* extract and/or one or more isolated cannabinoids or terpenoids.

As used herein, the term "*Cannabis* extract" means a compound or composition comprising one or more compounds extracted from a *Cannabis* or hemp plant. In one embodiment, a "*Cannabis* extract" may include one or more cannabinoids, terpenoids or terpenes or other phenolic compounds. Cannabinoids can be synthetic (chemically synthesized) or extracted from *Cannabis* plants such as *sativa*, indica, hemp or hybrid strains of *sativa* and indica. According to an optional embodiment of the invention the selected *Cannabis* extract may be "full spectrum" extract, meaning that it contains a blend of other cannabinoids, terpenes, flavonoids, and phytonutrients that boost its bioavailability. A full-spectrum *Cannabis* extract may preferably be from hemp. In certain embodiments a full-spectrum *Cannabis* extract may include primarily CBD, and one or more of the following cannabinoid selected from the group consisting of: Δ-9-THC, Δ-9-THC-A, Δ-8-THC, THC-V, CBD, CBD-A, CBG, CBN and CBC.

A *Cannabis* extract isolate, isolate, or isolated cannabinoid may refer to one or more specifically isolated cannabinoids or other components from a *Cannabis* extract.

As used herein, a "cannabinoid" is a chemical compound (such as cannabinol, THC or cannabidiol) that is found in the plant species *Cannabis* among others like: *Echinacea; Acmella Oleracea; Helichrysum Umbraculigerum; Radula Marginata* (Liverwort) and *Theobroma Cacao*, and metabolites and synthetic analogues thereof that may or may not have psychoactive properties. Cannabinoids therefore include (without limitation) compounds (such as THC) that have high affinity for the cannabinoid receptor (for example Ki<250 nM), and compounds that do not have significant affinity for the cannabinoid receptor (such as cannabidiol, CBD). Cannabinoids also include compounds that have a characteristic dibenzopyran ring structure (of the type seen in THC) and cannabinoids which do not possess a pyran ring (such as cannabidiol). Hence a partial list of cannabinoids includes THC, CBD, dimethyl heptylpentyl cannabidiol (DMHP-CBD), 6,12-dihydro-6-hydroxy-cannabidiol (described in U.S. Pat. No. 5,227,537, incorporated by reference); (3 S,4R)-7-hydroxy-Δ6-tetrahydrocannabinol homologs and derivatives described in U.S. Pat. No. 4,876,276, incorporated by reference; (+)-4-[4-DMH-2,6-diacetoxy-phenyl]-2-carboxy-6,6-dimethylbicyclo[3.1.1]hept-2-en, and other 4-phenylpinene derivatives disclosed in U.S. Pat. No. 5,434,295, which is incorporated by reference; and cannabidiol (-)(CBD) analogs such as (-)CBD-monomethylether, (-)CBD dimethyl ether; (-)CBD diacetate; (-)3'-acetyl-CBD monoacetate; and ±AF11, all of which are disclosed in Consroe et al., J. Clin. Phannacol. 21:428S-436S, 1981, which is also incorporated by reference. Many other cannabinoids are similarly disclosed in Agurell et al., Pharmacol. Rev. 38:31-43, 1986, which is also incorporated by reference.

As claimed herein, the term "cannabinoid" may also be generically applied to describe all cannabinoids, short-chain fatty acid phenolic compounds, endocannabinoids, phyto-cannabinoids, as well as terpenes that may interact with one or more solubilizing agents or carriers in an aloe vera extract as generally described herein. Moreover, as used herein, the term "solubilized cannabinoid" describes a "cannabinoid," that binds to or interacts with one or more solubilizing agents or carriers in an aloe vera extract as generally described herein and either increases it's water solubility, solubilizes the cannabinoid in oil, or is protected by interaction of one or more components in an aloe vera extract.

Examples of cannabinoids are tetrahydrocannabinol, cannabidiol, cannabigerol, cannabichromene, cannabicyclol, cannabivarin, cannabielsoin, cannabicitran, cannabigerolic acid, cannabigerolic acid monomethylether, cannabigerol monomethylether, cannabigerovarinic acid, cannabigerovarin, cannabichromenic acid, cannabichromevarinic acid, cannabichromevarin, cannabidolic acid, cannabidiol monomethylether, cannabidiol-C4, cannabidivarinic acid, cannabidiorcol, delta-9-tetrahydrocannabinolic acid A, delta-9-tetrahydrocannabinolic acid B, delta-9-tetrahydrocannabinolic acid-C4, delta-9-tetrahydrocannabivarinic acid, delta-9-tetrahydrocannabivarin, delta-9-tetrahydrocannabiorcolic acid, delta-9-tetrahydrocannabiorcol,delta-7-cis-iso-tetrahydrocannabivarin, delta-8-tetrahydrocannabiniolic acid, delta-8-tetrahydrocannabinol, cannabicyclolic acid, cannabicylovarin, cannabielsoic acid A, cannabielsoic acid B, cannabinolic acid, cannabinol methylether, cannabinol-C4, cannabinol-C2, cannabiorcol, 10-ethoxy-9-hydroxy-delta-6a-tetrahydrocannabinol, 8,9-dihydroxy-delta-6a-tetrahydrocannabinol, cannabitriolvarin, ethoxy-cannabitriolvarin, dehydrocannabifuran, cannabifuran, cannabichromanon, cannabicitran, 10-oxo-delta-6a-tetrahydrocannabinol, delta-9-cis-tetrahydrocannabinol, 3, 4, 5, 6-tetrahydro-7-hydroxy-alpha-alpha-2-trimethyl-9-n-propyl-2,6-methano-2H-1-benzoxocin-5-methanol-cannabiripsol, trihydroxy-delta-9-tetrahydrocannabinol, and cannabinol. Examples of cannabinoids within the context of this disclosure include tetrahydrocannabinol and cannabidiol.

The term "endocannabinoid" refers to compounds including arachidonoyl ethanolamide (anandamide, AEA), 2-arachidonoyl ethanolamide (2-AG), 1-arachidonoyl ethanolamide (1-AG), and docosahexaenoyl ethanolamide (DHEA, synaptamide), oleoyl ethanolamide (OEA), eicsapentaenoyl ethanolamide, prostaglandin ethanolamide, docosahexaenoyl ethanolamide, linolenoyl ethanolamide, 5(Z),8(Z),11(Z)-eicosatrienoic acid ethanolamide (mead acid ethanolamide), heptadecanoul ethanolamide, stearoyl ethanolamide, docosaenoyl ethanolamide, nervonoyl ethanolamide, tricosanoyl ethanolamide, lignoceroyl ethanolamide, myristoyl ethanolamide, pentadecanoyl ethanolamide, palmitoleoyl ethanolamide, docosahexaenoic acid (DHA). Particularly preferred endocannabinoids are AEA, 2-AG, 1-AG, and DHEA.

Terpenoids a.k.a. isoprenoids, are a large and diverse class of naturally occurring organic chemicals similar to terpenes, derived from five-carbon isoprene units assembled and modified in a number of varying configurations. Most are multi-cyclic structures that differ from one another not only in functional groups but also in their basic carbon skeletons. Terpenoids are essential for plant metabolism, influencing general development, herbivory defense, pollination, and stress response. These compounds have been extensively used as flavoring and scenting agents in cosmetics, detergents, food, and pharmaceutical products. They also display multiple biological activities in humans, such as anti-inflammatory, anti-microbial, antifungal, and antiviral.

*Cannabis* terpenoid profiles define the aroma of each plant and share the same precursor (geranyl pyrophosphate) and the same synthesis location (glandular trichomes) as phytocannabinoids. The terpenoids most commonly found in *Cannabis* extracts include: limonine, myrcene, alpha-pinene, linalool, beta-caryophyllene, caryophyllene oxide, nerolidol, and phytol. Terpenoids are mainly synthesized in two metabolic pathways: mevalonic acid pathway (a.k.a. HMG-CoA reductase pathway, which takes place in the cytosol) and MEP/DOXP pathway (a.k.a. The 2-C-methyl-D-erythritol 4-phosphate/1-deoxy-D-xylulose 5-phosphate pathway, non-mevalonate pathway, or mevalonic acid-independent pathway, which takes place in plastids). Geranyl pyrophosphate (GPP), which is used by *Cannabis* plants to produce cannabinoids, is formed by condensation of dimethylallyl pyrophosphate (DMAPP) and isopentenyl pyrophosphate (IPP) via the catalysis of GPP synthase. Alternatively, DMAPP and IPP are ligated by FPP synthase to produce farnesyl pyrophosphate (FPP), which can be used to produce sesquiterpenoids. Geranyl pyrophospliate (GPP) can also be converted into monoterpenoids by limonene synthase.

Some examples of terpenes, and their classification, are as follows. Hemiterpenes: Examples of hemiterpenes, which do not necessarily have an odor, are 2-methyl-1,3-butadiene, hemialboside, and hymenoside. Monoterpenes: pinene, a-pinene, β-pinene, cis-pinane, trans-pinane, cis-pinanol, trans-pinanol (Erman and Kane (2008) Chem. Biodivers. 5:910-919), limonene; linalool; myrcene; eucalyptol; a-phellandrene; β-phellandrene; a-ocimene; β-ocimene, cis-ocimene, ocimene, Δ-3-carene; fenchol; sabinene, borneol, isoborneol, camphene, camphor, phellandrene, a-phellandrene, a-terpinene, geraniol, linalool, nerol, menthol, myrcene, terpinolene, a-terpinolene, β-terpinolene, γ-terpinolene, Δ-terpinolene, α-terpineol, and trans-2-pinanol. Sesquiterpenes: caryophyllene, caryophyllene oxide, humulene, a-humulene, a-bisabolene; β-bisabolene; santalol; selinene; nerolidol, bisabolol; a-cedrene, β-cedrene, β-eudesmol, eudesm-7(11)-en-4-ol, selina-3,7(11)-diene, guaiol, valencene, a-guaiene, β-guaiene, Δ-guaiene, guaiene, farnesene, a-farnesene, β-farnesene, elemene, a-elemene, β-elemene, γ-elemene, Δ-elemene, germacrene, germacrene A, germacrene B, germacrene C, germacrene D, and germacrene E. Diterpenes: oridonin, phytol, and isophytol. Triterpenes: ursolic acid, oleanolic acid. Terpenoids, also known as isoprenoids, are a large and diverse class of naturally occurring organic chemicals similar to terpenes, derived from five-carbon isoprene units assembled and modified in a number of ways. Most are multicyclic structures that differ from one another not only in functional groups but also in their basic carbon skeletons.

The terms "approximately" and "about" refer to a quantity, level, value, or amount that varies by as much as 30%, or in another embodiment by as much as 20%, or in a third embodiment by as much as 10% to a reference quantity, level, value or amount, or in a fourth embodiment by as much as 5% to a reference quantity, level, value or amount.

As used herein, the singular form "a," "an," and "the" include plural references unless the context clearly dictates otherwise.

The invention now being generally described will be more readily understood by reference to the following examples, which are included merely for the purposes of illustration of certain aspects of the embodiments of the present invention. The examples are not intended to limit the invention, as one of skill in the art would recognize from the above teachings and the following examples that other techniques and methods can satisfy the claims and can be employed without departing from the scope of the claimed invention. Indeed, while this invention has been particularly shown and described with references to preferred embodiments thereof, it will be understood by those skilled in the art that various changes in form and details may be made therein without departing from the scope of the invention encompassed by the appended claims.

EXAMPLES

Example 1: Cannabinoid Pharmacokinetic Testing Methodology

In one embodiment, the present inventors investigated the pharmacokinetics of a novel cannabinoid and aloe vera formulation of the invention delivered orally in a capsule. In this pharmacokinetic study, the novel composition containing an exemplary CBD cannabinoid (identified as DH1) was compared against a generic commercial CBD-containing capsule in a standard lipid suspension of an equivalent dosage, also delivered orally to the study participants (identified herein as SB1 product). Both CBD (and its primary metabolites) and THC (and its primary metabolites) were being observed at two hours after the initial dose.

In this embodiment, participants were given an initial dosage of either the DH1 product or the SB1 product containing CBD. Participants received an initial dosage of 96 mg of CBD of the DH1 product or 75 mg of the SB1 product. The same participants were used in each phase of the testing. Testing was separated by two weeks to allow the body to clear any remaining CBD isolates prior to the following test. CBD was administered via oral capsules. Blood was drawn from each participant prior to ingesting the CBD formulations (DH1 and SB1) and 2 hours after ingestion. This is consistent with maximal blood serum levels ($T_{max}$) previously identified in the literature.

Serum analysis was performed for CBD and several primary metabolites (6a-OH-CBD, 6b-OH-CBD, 7-OH CBD, 7-CBD-COOH and CED-Gluc). The body metabolizes the CBD at different rates and into different compounds, so testing a variety of the metabolites gives a broader view of how much was retained by the body. THC and several metabolites were also tested evaluated (11-OH-THC—active, THC-COOH—inactive, THC COOH-Gluc—inactive, and THC-Gluc—active) in this testing.

To accurately compare the absorption and metabolism of the DH1 product against SB1, the study was designed to account for differences in the amount of CBD originally ingested by the participants. For the DH1 product, participants were given a total dose of 96 mg of CBD. For the SB product, participants received 75 mg of CBD. We know from the literature that maximum serum concentration ($C_{max}$) is dose dependent. Therefore, data from the SB product is adjusted by an increase in 28%.

Specific outlier data was omitted to normalize the data set. The overall CBD and metabolites in one of the blood draws were found to be (after adjustment) 240.6 ng/ml, more than 4 times higher than any other sample and more than 11 times higher than the overall average. This blood draw also contained by far the highest levels of THC and metabolites—after review, it was concluded that this data was flawed in the testing (as the initial levels did not report higher than expected) and was removed from data.

Figures 3, 4:
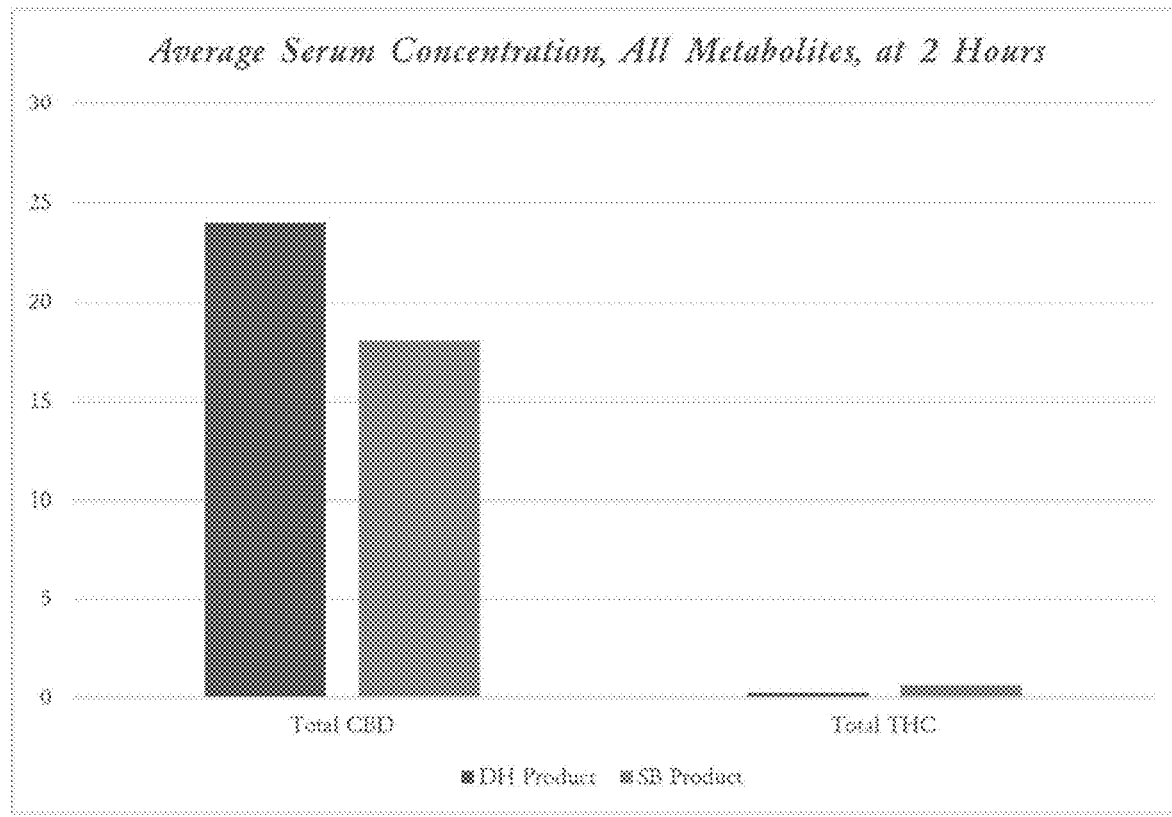
FIG. 3 shows a graphical description of all blood serum levels of various cannabinoid metabolites at 2 hours after ingestion of formulation DH1 of the invention containing a CBD-infused aloe vera extract, compared to commercially obtained CBD capsule dose in one embodiment thereof.
FIG. 4 shows rank-sum analysis of four CBD metabolites detected in the test subjects identified in FIGS. 1-3 in one embodiment thereof.

Example 2: Oral Administration of Cannabinoid+Aloe Vera Formulation Increase Bioavailability in Subjects As shown in FIGS. 1-3, after adjusting for the lower amount of SB1 product given in the dosing and the outlier data, the DH1 product delivered 25% more CBD and metabolites into the blood serum than the SB product. The DH product also showed less THC (both in active and inactive metabolites) than the SB product.

Example 3. Rank Sum Analysis of Cannabinoid+Aloe Vera Formulation

As shown in FIG. 3, rank-sum analysis was conducted, where the data was 'ranked' to better organize and report it. This analysis was done by the present inventor to identify patterns when looking at the highest-performing values, for example. In this analysis, the present inventors found that of the top performers in each category, 11 of the 16 (68.7%) are from the DH1 formulation of the invention, more than would be expected to find by simple chance. DH1 formulation Did increase the amount of CBD and CBD-metabolites in the blood serum as compared to a SB1 by as much as 25%.

Example 4: Evaluation of Analgesic Properties of Novel Inventive Compositions

The present inventor initiated a study is to evaluate the analgesic properties of a proprietary combination of cannabidiol (CBD), other cannabinoids from a *Cannabis* extract, and aloe vera administered orally by a capsule. The studies subjected presented with complaints of chronic pain with differing etiologies. Patients are given a single capsule daily of the novel formulation of the invention and asked to rate their pain levels that day.

This study utilizes a propriety combination of cannabidiol, cannabinoids from a *Cannabis* extract, and aloe vera in a daily oral capsule taken by subject with chronic pain. A first exemplary subject presented with pain due to diagnoses of interstitial cystitis, rheumatoid arthritis, and fibromyalgia. A second subject presented with pain due to traumatic injury to the spinal cord and surrounding nerves. A third subject presented with pain due to osteoarthritis of the knee. All subjects meet the definition of chronic pain, with pain lasting longer than six months. Subjects were asked to take a single daily dose of the invention's exemplary formulation containing approximately 48 mg of CBD and 250 mg of aloe vera to aid the absorption of the cannabinoids. Subjects were asked to rate their daily pain levels—either no change, some relief or significant relief. Statistical analysis was conducted using a 'response day' (i.e., any day where the subject noted either some or significant relief) as a binary variable. It was assumed a placebo product would have a 50% response rate from subjects. Statistical significance will be calculated for each patient individually and for the three-sample group together.

Figures 5, 6:
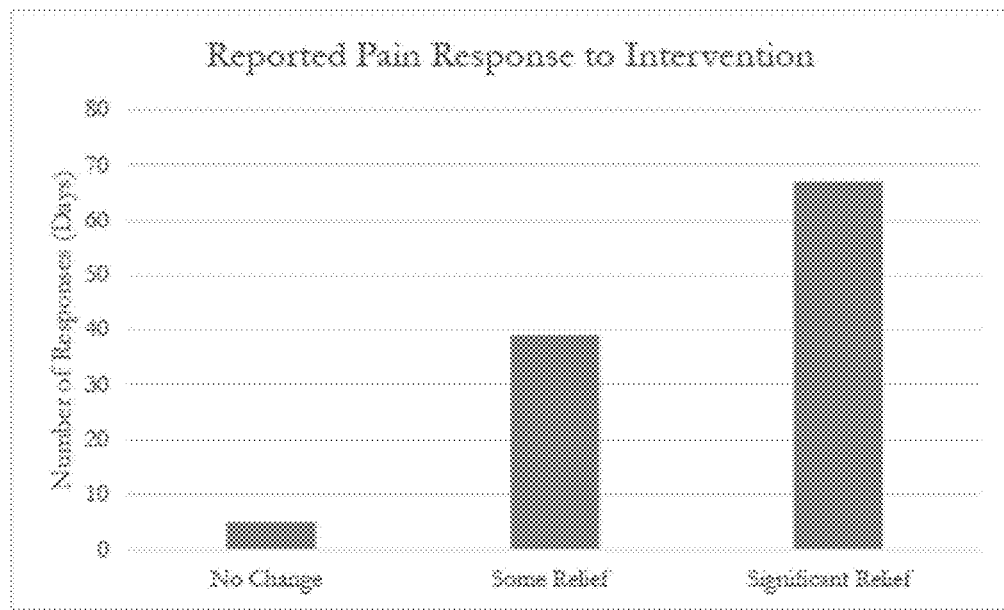
FIG. 5 shows a statistical breakdown of a pain self-reporting study conducted by the inventors. Responses were recorded by the patients on a combined 111 of 118 possible study days (94.1% compliance). Of the 111 recorded days, 5 days were reported as 'no relief,' 39 were reported as 'some relief' and 67 were reported as 'significant relief' in one embodiment thereof.
FIG. 6 shows a graphical breakdown of a pain self-reporting study conducted by the inventors in one embodiment thereof.
Figures 7C, 7D:
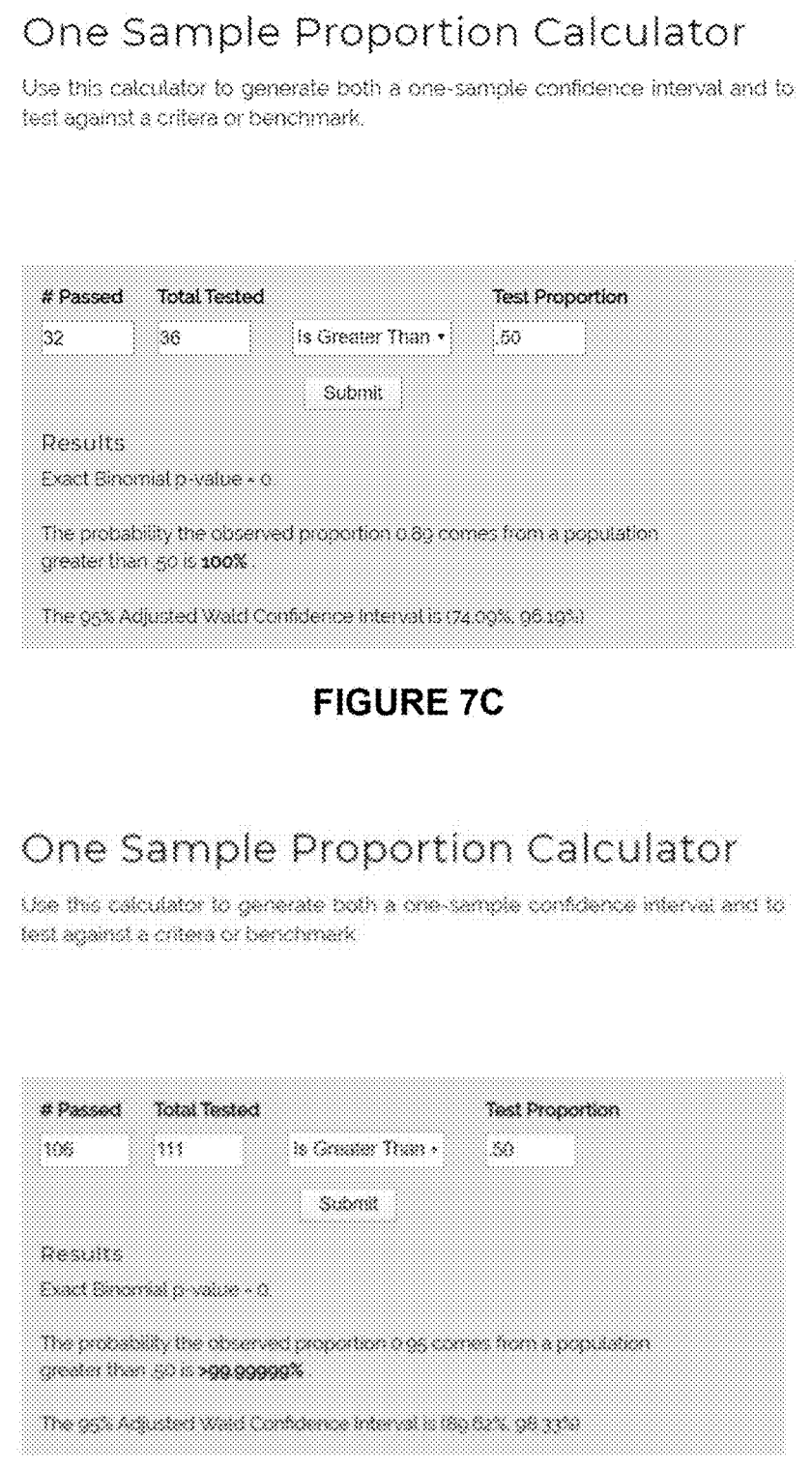

Example 5: Novel Inventive Compositions Presented Analgesic Effects in Subjects As shown in FIG. 5-7, responses were recorded by the patients on a combined 111 of 118 possible study days (94.1% compliance). Of the 111 recorded days, 5 days were reported as 'no relief,' 39 were reported as 'some relief' and 67 were reported as 'significant relief.'

When analyzed individually, all study subjects showed statistically significant improvements as compared to the established baseline assumption of 50% of day with at least some relief. Overall, the subjects reported approximately 96% of days with at least some symptomatic relief of pain with the intervention. For each individual subject, as well as the group as a whole, the p-value was <0.001 (99.99% probability that the intervention was more successful than the baseline assumption of 50% of days with some symptom relief).

The test intervention was successful in exceeding the expected 50% of days with at least some symptom relief assumed with a placebo. With a single daily dose, the three subjects reported at least some pain relief on 96% of the reported days. This improvement was seen across all three patients with differing symptom etiologies. This initial evaluation provides evidence the studied intervention may be effective in providing pain relief to patients suffering with chronic pain. As noted above, the analgesic effects of the novel formulation may be enhanced by the increased bioavailability of the cannabinoids, and especially CBD in certain embodiments.

TABLE 1

Active Ingredients in Aloe Vera Plant Extract

| | |
|---|---|
| Anthraquinones/ anthrones | Aloe-emodin, aloetic-acid, anthranol, aloin A and B (or collectively known as barbaloin), isobarbaloin, emodin, ester of cinnamic acid |
| Carbohydrates | Pure mannan, acetylated mannan, acetylated glucomannan, glucogalactomannan, galactan, galactogalacturan, arabinogalactan, galactogluco-arabinomannan, pectic substance, xylan, cellulose |
| Chromones | 8-C-glucosyl-(2'-O-cinnamoyl)-7-O-methylaloediol A, 8-C-glucosyl-(S)-aloesol, 8-C-glucosyl-7-O-methyl-(S)-aloesol, 8-C-glucosyl-7-O-methyl-aloediol, 8-C-glucosyl-noreugenin, isoaloeresin D, isorabaichromone, neoaloesin A |
| Enzymes | Alkaline phosphatase, amylase, carboxypeptidase, catalase, cyclooxidase, cyclooxygenase, lipase, oxidase, phosphoenolpyruvate carboxylase, superoxide dismutase |
| Inorganic compounds | Calcium, chlorine, chromium, copper, iron, magnesium, manganese, potassium, phosphorous, sodium, zinc |
| Miscellaneous including organic compounds and lipids | Arachidonic acid, γ-linolenic acid, steroids (campestral, cholesterol, β-sitosterol), triglicerides, triterpenoid, gibberillin, lignins, potassium sorbate, salicylic acid, uric acid |
| Non-essential and essential amino acids | Alanine, arginine, aspartic acid, glutamic acid, glycine, histidine, hydroxyproline, isoleucine, leucine, lysine, methionine, phenylalanine, proline, threonine, tyrosine, valine |
| Proteins | Lectins, lectin-like substance |
| Saccharides | Mannose, glucose, L-rhamnose, aldopentose |
| Vitamins | B1, B2, B6, C, β-carotene, choline, folic acid, α-tocopherol |

TABLE 2

Exemplary Formulation by % weight/volume

| Extract | Embodiment 1 % | Embodiment 2 % | Embodiment 3 % |
|---|---|---|---|
| Aloe Vera | 83.89% | 83-84% | 80-87% |
| CBD Isolate | 9.66% | 9-10% | 6-13% |
| CBD Full Spectrum | 6.44% | 6-7% | 3-10% |

REFERENCES

[1] Surjushe A, Vasani R, Saple D G. Aloe vera: a short review. *Indian J Dermatol.* 2008; 53(4): 163-166.

What is claimed is:

1. A method for treating chronic pain associated with interstitial cystitis, rheumatoid arthritis, fibromyalgia, nerve damage, or osteoarthritis in a subject in need thereof comprising, administering a therapeutically effective amount of composition including a whole leaf aloe vera extract that is charcoal activated such that anthraquinones and insoluble fibers are removed, solubilizing a *Cannabis* extract in the whole leaf aloe vera extract, wherein said *Cannabis* extract comprises a cannabidiol (CBD) isolate, and wherein said CBD isolate exhibits enhanced bioavailability when administered to said subject and increased effectiveness for treating chronic pain against administering *Cannabis* extract without the whole leaf aloe vera extract, wherein the composition is not a nanoemulsion or liposomes, the CBD isolate is about 48 mg and administered orally.

2. The method of claim 1, wherein said composition is orally administered and the CBD isolate exhibits a 25% enhanced bioavailability compared against administering *Cannabis* extract without the whole leaf aloe vera extract.

3. The method of claim 1, wherein said CBD comprises 6-7% % w/v of the composition and a concentration of aloe vera extract is between 80% to 87% w/v of the composition.

4. The method of claim 1, wherein said CBD comprises 9-10% % w/v of the composition and the increased effectiveness for treating chronic pain 96% of days with at least some symptomatic relief of pain with the intervention.

5. The method of claim 1, wherein said aloe vera extract comprises an aloe vera extract derived from *Aloe barbadensis* Miller, or *Aloe aborescens*.

6. The method of claim 1, wherein said aloe vera extract is freeze dried.

7. The method of claim 1, wherein the aloe vera extract comprises one or more active ingredients selected from the group consisting of: anthranol, ester of cinnamic acid, galactan, galactogalacturan, arabinogalactan, galactoglucoarabinomannan, pectic substance, xylan, 8-C-glucosyl-(2'-O-cinnamoyl)-7-O-methylaloediol A, neoaloesin A, alkaline phosphatase, amylase, carboxypeptidase, catalase, cyclooxidase, cyclooxygenase, lipase, oxidase, phosphoenolpyruvate carboxylase, superoxide dismutase, calcium, chlorine, chromium, copper, iron, magnesium, manganese, potassium, phosphorous, sodium, zinc, calcium, chlorine, chromium, copper, iron, magnesium, manganese, potassium, phosphorous, sodium, zinc, arachidonic acid, γ-linolenic acid, steroids including campestrol, cholesterol, β-sitosterol, triglycerides, triterpenoid, gibberellin, lignins, potassium sorbate, salicylic acid, uric acid, alanine, arginine, aspartic acid, glutamic acid, glycine, histidine, hydroxyproline, isoleucine, leucine, lysine, methionine, phenylalanine, proline, threonine, tyrosine, valine, lectins, mannose, glucose, L-rhamnose, aldopentose, vitamin B1, vitamin B2, vitamin B6, vitamin C, β-carotene, choline, folic acid, and α-tocopherol.

8. A method for treating chronic pain associated with interstitial cystitis, rheumatoid arthritis, fibromyalgia, nerve damage, or osteoarthritis in a subject in need thereof comprising, administering a therapeutically effective amount of pharmaceutical composition including a whole leaf aloe vera extract that is charcoal activated such that anthraquinones and insoluble fibers are removed, solubilizing a *Cannabis* extract in the whole leaf aloe vera extract, wherein said *Cannabis* extract comprises a cannabidiol (CBD) isolate, and a pharmaceutically acceptable excipient, and the CBD isolate comprises an increased effectiveness for treating chronic pain against administering *Cannabis* extract without the whole leaf aloe vera extract, wherein the composition is not a nanoemulsion or liposomes, the CBD isolate is about 48 mg and administered orally.

9. The method of claim 8, wherein said composition is orally administered and the CBD isolate exhibits a 25% enhanced bioavailability compared against administering *Cannabis* extract without the whole leaf aloe vera extract.

10. The method of claim 8, wherein said CBD comprises 6-7% % w/v of the composition.

11. The method of claim 8, wherein said CBD comprises 9-10% % w/v of the composition.

12. The method of claim 8, wherein said aloe vera extract comprises an aloe vera extract derived from *Aloe barbadensis* Miller, or *Aloe aborescens*.

13. The method of claim 8, wherein the aloe vera extract comprises one or more active ingredients selected from the group consisting of: anthranol, of cinnamic acid, galactan, galactogalacturan, arabinogalactan, galactoglucoarabinomannan, pectic substance, xylan, 8-C-glucosyl-(2'-O-cinnamoyl)-7-O-methylaloediol A, neoaloesin A, alkaline phosphatase, amylase, carboxypeptidase, catalase, cyclooxidase, cyclooxygenase, lipase, oxidase, phosphoenolpyruvate carboxylase, superoxide dismutase, calcium, chlorine, chromium, copper, iron, magnesium, manganese, potassium, phosphorous, sodium, zinc, calcium, chlorine, chromium, copper, iron, magnesium, manganese, potassium, phosphorous, sodium, zinc, arachidonic acid, γ-linolenic acid, steroids including campestrol, cholesterol, β-sitosterol, triglycerides, triterpenoid, gibberellin, lignins, potassium sorbate, salicylic acid, uric acid, alanine, arginine, aspartic acid, glutamic acid, glycine, histidine, hydroxyproline, isoleucine, leucine, lysine, methionine, phenylalanine, proline, threonine, tyrosine, valine, lectins, mannose, glucose, L-rhamnose, aldopentose, vitamin B1, vitamin B2, vitamin B6, vitamin C, β-carotene, choline, folic acid, and α-tocopherol.

\* \* \* \* \*